(12) United States Patent
von Hybschmann et al.

(10) Patent No.: US 8,379,072 B2
(45) Date of Patent: Feb. 19, 2013

(54) APPARATUS AND METHOD FOR REALTIME REMOTE INTERPRETATION

(75) Inventors: Krystofer von Hybschmann, Phoenix, AZ (US); Dan Walter, Gilbert, AZ (US); Adam Lofredo, Queen Creek, AZ (US)

(73) Assignee: Exhibitone Corporation, Phoenix, AZ (US)

( * ) Notice: Subject to any disclaimer, the term of this patent is extended or adjusted under 35 U.S.C. 154(b) by 645 days.

(21) Appl. No.: 12/569,767

(22) Filed: Sep. 29, 2009

(65) Prior Publication Data

US 2011/0066422 A1 Mar. 17, 2011

Related U.S. Application Data

(60) Provisional application No. 61/242,777, filed on Sep. 15, 2009.

(51) Int. Cl.
*H04N 7/14* (2006.01)
(52) U.S. Cl. ............... 348/14.01; 341/14.08; 341/14.12
(58) Field of Classification Search .... 348/14.01–14.16; 704/3, 277, 9; 705/2–4
See application file for complete search history.

(56) References Cited

U.S. PATENT DOCUMENTS

| 7,069,222 B1 * | 6/2006 | Borquez et al. | 704/277 |
| 2005/0216252 A1 * | 9/2005 | Schoenbach et al. | 704/3 |
| 2005/0251421 A1 * | 11/2005 | Chang et al. | 705/2 |

* cited by examiner

*Primary Examiner* — Melur Ramakrishnaiah
(74) *Attorney, Agent, or Firm* — Wright Law Group, PLLC; Mark F. Wright (57) ABSTRACT

The most preferred embodiments of the present invention are configured to allow a foreign language interpreter to remotely monitor, control, and interpret various legal proceedings for one or more remote locations, such as courtrooms. The interpreter will use a computer-based system to monitor and control the audio-video functions and communications that take place in one or more remote locations and to pass audio and/or video signals to and from the interpreter and the remote locations, including the people in the remote location that need interpretation services. This system allows the interpreter to monitor facial characteristics of the speakers, route the audio to isolated headsets when interpreting into the foreign language, route the audio to sound reinforcement speakers when interpreting from the foreign language, and interpret a "private" conversation between multiple parties speaking different languages. The various unique features and configurations provided by the various preferred embodiments of the present invention allow for the implementation of a comprehensive Distance Court Interpretation (DCI) system.

20 Claims, 5 Drawing Sheets

APPARATUS AND METHOD FOR REALTIME REMOTE INTERPRETATION

RELATED APPLICATIONS

This non-provisional patent application claims the benefit of the filing date of U.S. Provisional Patent Application Ser. No. 61/242,777, which application was filed on Sep. 15, 2009, and which application is incorporated herein by reference.

BACKGROUND OF THE INVENTION

1. Technical Field

The present invention relates generally to the field of language interpretation and more specifically relates to equipment and methods for providing real-time interpretation for remote locations such as a courtroom.

2. Background Art

The world is an increasingly heterogeneous environment with people from many different cultures and nations mixing together and interacting as they migrate from place to place. This tremendous growth in diverse populations is not without its problems. For example, the continued influx of immigrants into the United States has created a new set of issues in the legal community, including different cultural norms and a diversity of languages that may present a barrier to the effective and efficient operation of the traditional legal process.

In order to assist people from other countries and nations with the intricacies of the legal process, the use of interpreters in environments like the courtroom has become more prevalent. By using interpreters to assist people who don't speak the native language employed by the legal system, the rights of the individual and the integrity of the legal system can be maintained.

It is now at least somewhat routine to enter a courtroom and see the plaintiff and/or the defendant represented not only by an attorney, but also by an interpreter. The interpreter can be a critical part of the process as the interpreter ensures that the individuals involved in the legal proceeding understand what is happening. This can be a significant benefit for people who are not conversant in English as they attempt to navigate the already stormy seas of civil litigation or criminal proceedings.

While the use of interpreters in the courtroom is a fairly common occurrence, there are some issues associated with the practice. For example, trained legal interpreters are not readily available in all locations and at all times. Additionally, given the wide variety of languages now found in American society, there is a high probability that an appropriate interpreter will not be available for all possible languages. Finally, the cost associated with providing legal proceedings in a wide variety of languages can be daunting from the budgetary perspective of most municipal and state governments. Accordingly, without improvements in the current procedures and methods for providing legal translation services, the process will continue to be sub-optimal.

BRIEF SUMMARY OF THE INVENTION

While the use of interpreters in the courtroom is a fairly common occurrence, there are some issues associated with the practice. For example, trained legal interpreters are not readily available in all locations and at all times. Additionally, given the wide variety of languages the most preferred embodiments of the present invention are configured to allow a foreign language interpreter to remotely monitor, control, and interpret various legal proceedings for one or more remote locations, such as courtrooms. The interpreter will use a computer-based system to monitor and control the audio-video functions and communications that take place in one or more remote locations and to pass audio and/or video signals to and from the interpreter and the remote locations, including the people in the remote location that need interpretation services. This system allows the interpreter to monitor facial characteristics of the speakers, route the audio to isolated headsets when interpreting into the foreign language, route the audio to sound reinforcement speakers when interpreting from the foreign language, and interpret a "private" conversation between multiple parties speaking different languages. The various unique features and configurations provided by the various preferred embodiments of the present invention allow for the implementation of a comprehensive Distance Court Interpretation (DCI) system.

BRIEF DESCRIPTION OF THE FIGURES

The preferred embodiments of the present invention will hereinafter be described in conjunction with the appended drawings, wherein like designations denote like elements, and.

DETAILED DESCRIPTION OF THE INVENTION

The most preferred embodiments of the present invention are configured to allow a foreign language interpreter to remotely monitor, control, and interpret court proceedings for one or more remote locations. The interpreter will use a computer-based system to monitor and control the audio-video functions and communications that take place in one or more remote locations and to pass audio and/or video signals to and from the interpreter and the remote locations, including the people in the courtroom that need interpretation services. This system allows the interpreter to monitor facial characteristics of the speakers, route the audio to isolated headsets when interpreting into the foreign language, route the audio to sound reinforcement speakers when interpreting from the foreign language, and interpret a "private" conversation between multiple parties speaking different languages.

In at least one preferred embodiment of the present invention, the audio-video equipment necessary for providing remote translation services is permanently installed in one or more remote locations, thereby providing for "on-demand"

availability for remote translation services. In at least one other preferred embodiment of the present invention, the audio-video equipment necessary for providing remote translation services is installed on a temporary, ad-hoc basis, thereby providing for "as-needed" remote translation services.

Figure 1:
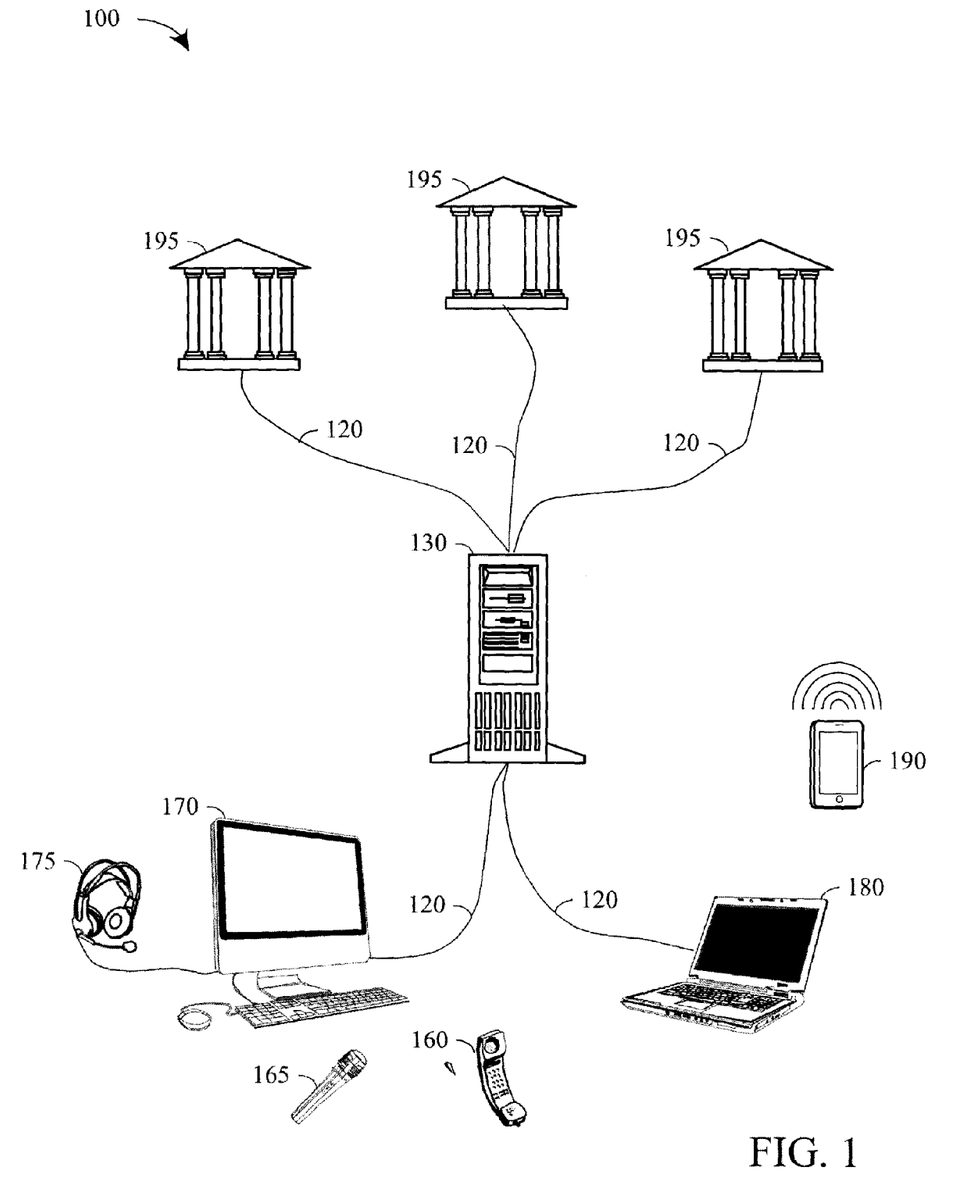
FIG. 1 is a perspective view of a computer-based apparatus for providing real-time remote translation services in accordance with a preferred exemplary embodiment of the present invention.

Referring now to FIG. 1, a computer-based apparatus for providing real-time remote translation services system 100 in accordance with a preferred exemplary embodiment of the present invention comprises: a data server 130; at least one of a desktop computer 170 and a laptop computer 180; at least one of a telephone 160; a microphone 165; and a headset 175; and/or a phone 190; all connected or coupled via a network 120 to one or more locations such as courthouses 195.

Taken together, the components of computer-based apparatus for providing real-time remote translation services system 100 provide a way for a translator that is remotely located at a location other then a courthouse 195 to access one or more components or subsystems of computer-based apparatus for providing real-time remote translation services system 100 as described herein in conjunction with the various preferred embodiments of the present invention.

With the apparatus described herein, the remotely located translator is enabled to provide real-time translation services to one or more persons at a point of origination (e.g., courthouse 195) by accessing an audio signal containing the conversation to be translated without being physically present in courthouse 195. This allows a single translator to establish a virtual presence at any properly equipped courthouse 195 and to quickly and efficiently provide remote translation services to a plurality of remote locations such as one or more courthouses 195 without ever traveling to any specific courthouse 195. For purposes of this application, "remote" translation services refers generally to a situation where the interpreter providing the translation services is not located in the same room as the person or persons for whom the translation service is being provided.

While the present invention will be described in detail by using various examples of a typical translation process conducted at a courthouse, those skilled in the art will recognize that the methods and techniques described herein have broad applicability to other environments and applications where quick and efficient access to remote translation services is desirable.

Network 120 represents any suitable computer communication link or communication mechanism, including a hardwired connection, an internal or external bus, a connection for telephone access via a modem, standard co-axial cable lines, high-speed T1 line, radio, infrared or other wireless communication methodologies (i.e. "Bluetooth," infrared (IR), etc.), private or proprietary local area networks (LANs) and wide area networks (WANs), as well as standard computer network communications over the Internet or an internal network (e.g. "intranet") via a wired or wireless connection, or any other suitable connection between computers and computer components known to those skilled in the art, whether currently known or developed in the future. It should be noted that portions of network 120 may suitably include a dial-up phone connection, a broadcast cable transmission line, a Digital Subscriber Line (DSL), an ISDN line, or similar public utility-like access link.

In the most preferred embodiments of the present invention, at least a portion of network 120 comprises a standard Internet connection between the various components of computer-based apparatus for providing real-time remote translation services system 100. Network 120 provides for communication between the various components of computer-based apparatus for providing real-time remote translation services system 100 and allows for relevant information to be transmitted from device to device. In this fashion, a user of computer-based apparatus for providing real-time remote translation services system 100 can quickly and easily gain access to the relevant data and information utilized to search, retrieve, and display information from one or more databases as described in conjunction with the preferred embodiments of the present invention.

In the most preferred embodiments of the present invention, network 120 is configured to provide relatively high-speed transmission of both audio and video data and signals and comprises at least an Internet connection for transmission of video data captured by one or more video input mechanism (e.g. video camera) and a phone connection for transmission of audio data captured by one or more microphones that have been interfaced to network 120 or to a standard phone connection. The phone connection may be interfaced to a standard phone system typically found in most homes and commercial facilities, including for example, the existing phone system infrastructure of courtroom 195.

In addition to the other components shown in FIG. 1, a wireless communication access device may be communicatively coupled to network 120 and may be type any wireless communication mechanism that is known to those skilled in the art to provide for wireless communication between network 120 and the various devices associated with network 120, including desktop computer 170, laptop computer 180 and phone 190. The most preferred embodiments of an acceptable wireless communication access device may comprise any type of wireless bridge, wireless router, or similar type of device.

Regardless of the specific components, physical nature, and topology, network 120 serves to logically and communicatively link the physical components of computer-based apparatus for providing real-time remote translation services system 100 together, regardless of their physical proximity, thereby enabling communication between the components. This is especially important because in many preferred embodiments of the present invention, data server 130, desktop computer 170, and laptop computer 180 may be geographically remote and/or physically separated from each other.

Data server 130 represents a relatively powerful computer system that is made available to desktop computer 170, laptop computer 180, and/or phone 190 via network 120. Various hardware components (not shown this FIG.) such as external monitors, keyboards, mice, tablets, hard disk drives, recordable CD-ROM/DVD drives, jukeboxes, fax servers, magnetic tapes, and other devices known to those skilled in the art may be used in conjunction with data server 130. Data server 130 may also provide various additional software components (not shown this FIG.) such as database servers, web servers, firewalls, security software, and the like. The use of these various hardware and software components is well known to those skilled in the art.

Given the relative advances in the state-of-the-art computer systems available today, it is anticipated that functions of data server 130 may be provided by many standard, readily available data servers. This may also include the deployment of multiple inter-connected and redundant data servers 130 to enhance the availability and reliability of the functions provided by data server 130. Depending on the desired size and relative power required for data server 130, storage area network (SAN) technology may also be deployed in certain preferred embodiments of the present invention. Additionally, various biometric and identification verification devices for identifying users and controlling access as well as creating and verifying digital signatures (i.e., electronic signature processing) may also be included.

Desktop computer 170 may be any type of computer system known to those skilled in the art that is capable of being configured for use with computer-based apparatus for providing real-time remote translation services system 100 as described herein. It should be noted that no specific operating system or hardware platform is excluded and it is anticipated that many different hardware and software platforms may be configured to create computer 170. As previously explained in conjunction with data server 130, various hardware components and software components (not shown this FIG.) known to those skilled in the art may be used in conjunction with computer 170. It should be noted that in the most preferred embodiments of the present invention, desktop computer 170 is linked (via wired or wireless connection) to its own LAN or WAN and has access to its own data server (not shown this FIG.).

In addition as shown in FIG. 1, a telephone 160 may be used in conjunction with computer 170 to allow the remote interpreter to communicate with one or more persons located inside a courtroom 195. In this configuration, the video signal from a courtroom 195 may be displayed on the screen or display portion of computer 170 and the audio signal may be transmitted to and from the interpreter and one or more persons located inside a courtroom 195 via telephone 160, In this application, telephone 160 has been communicatively coupled to or otherwise interfaced with the standard telephone communication infrastructure associated with a courtroom 195.

In at least one preferred embodiment of the present invention, a microphone 165 may also be communicatively coupled to or otherwise interfaced with the standard telephone communication infrastructure associated with a courtroom 195 and used by the remote interpreter to transmit audio signals to a courtroom 195.

In at least another preferred embodiment of the present invention, a headset 175 may be connected to computer 170. Headset 175 is any type of communication device (e.g., built-in speakers, external computer speakers, Bluetooth headset, USB headset, etc.) that may be known to those skilled in the art that can be configured to allow the translator that is using computer 170 to have access to the audio signal that is received from courthouse 195 via server 130 and network 120. In addition, the microphone attached to headset 175 represents any type of audio capture device that may be used to capture the audio signal (e.g., verbal communication) from the translator. Once captured, the audio signal may be transmitted via server 130 to courthouse 195 where the client needing the translation services can hear the translation provided by the interpreter. The audio signal may be transmitted via standard telephone communications networks or using the Internet in a Voice over IP network interface. In a similar fashion, the translator can view the video signal transmitted from a courthouse 195 to computer 170 via server 130 and network 120. Additionally, a built-in or peripheral camera may be used to transmit a video signal from the remote translator to one or more persons located within a courtroom 195.

Similarly, laptop computer 180 may be any type of relatively lightweight portable computer system known to those skilled in the art that is capable of being configured for use with computer-based apparatus for providing real-time remote translation services system 100 as described herein. This includes tablet computers, pen-based computers and the like. Computer 180 may also be configured with a headset 175 to allow the transmission and reception of audio signals to and from courthouse 195 via server 130 and network 120.

Additionally, netbooks, handheld and palmtop devices are also specifically included within the description of devices that may be deployed as a laptop computer 180. It should be noted that no specific operating system or hardware platform is excluded and it is anticipated that many different hardware and software platforms may be configured to create laptop computer 180. As previously explained in conjunction with data server 130, various hardware and software components (not shown this FIG.) known to those skilled in the art may be used in conjunction with laptop computer 180. It should also be noted that in the most preferred embodiments of the present invention, laptop computer 180 is linked to its own LAN or WAN and has access to its own data server (not shown this FIG.).

In general, the communication between devices associated with data server 130 will be data associated with scheduling, managing, monitoring, and providing remote translation services to one or more persons located at a facility such as courthouse 195. The users of desktop computer 170 and/or laptop computer 180 may be program administrators, managers and/or prospective clients who are seeking to make determinations regarding the provision of translation services and related activities. Additionally, various related service providers such as government agencies, law firms, social service organizations, and their employers and agents may also have access to one or more databases located on data server 130 via desktop computer 170 and/or laptop computer 180.

A typical series of transactions may be represented by a request to schedule a translator to provide remote translation services for a prospective client on a given day at a specific location. In this case, information regarding the prospective client (e.g., language required for translation, date and time of appearance, location of the deposition, trial, etc.) may be sent from desktop computer 170 and/or laptop computer 180 to data server 130. In response to the request for translation services, a confirmation notice providing information for the engagement of the translator (e.g., fees, identity of translator, etc.) may be sent via data server 130 to the appropriate desktop computer 170 and/or laptop computer 180. Then, at the appointed time, the translator can use computer-based apparatus for providing real-time remote translation services system 100 to provide the scheduled remote translation services.

Upon receipt of a valid request, data server 130 processes the request to access one or more databases containing the relevant information and takes the specific action requested by desktop computer 170 and/or laptop computer 180, typically by retrieving and returning the requested data to desktop computer 170 and/or laptop computer 180. The request may be directed towards locating a specific item in a database, comparing one or more items in the database, obtaining additional information from a database about one or more prospective clients, determining and calculating fees, scheduling translation services, or other similar requests. Additionally, data server 130 may also be used to store the translation related video and audio data that is transmitted to and from courthouse 195 to desktop computer 170 and/or laptop computer 180, via data server 130.

It should be noted that while FIG. 1 shows only a single desktop computer 170 and a single laptop computer 180, it is anticipated that the most preferred embodiments of the present invention will comprise hundreds or even thousands of computer systems 170 and laptop computers 180. Each of these computers 170 and 180 will be configured to access data server 130 in an appropriately secure way so as to accomplish the specific objectives of the user of the desktop computer 170 or laptop computer 180. For example, the service provider that controls the databases stored on data server 130 may utilize desktop computer 170 or laptop computer 180 to access data server 130 and create or modify a given database. An operator, located in a remote location, may use desktop computer 170 or laptop computer 180 to access data server 130 to retrieve information about the provision of translation services for one or more clients whose information is stored in a database stored on data server 130, etc. Additionally, the audio and video data stored at data server 130 may be stored and accessed at a later date for evidentiary purposes, to provide a transcript of the proceedings for appeal, etc.

In the most preferred embodiments of the present invention, multiple desktop computers 170 and multiple laptop computers 180 will all be configured to communicate simultaneously with data server 130 and with each other via network 120. In addition, the most preferred embodiments of the present invention include an Application Service Provider (ASP) environment where data server 130 is operated as a clearinghouse in a hosted operation. In this fashion, multiple desktop computers 170 and laptop computers 180 will have access to data server 130 and the databases stored thereon via a global computer network such as the Internet. Data server 130 is further described below in conjunction with FIG. 2 below.

An optional printer and an optional fax machine may also be deployed for various hard copy data output requirements and may be considered to be any standard peripheral devices used for transmitting or outputting paper-based documents, notes, transaction details, reports, etc. in conjunction with the various requests and transactions processed by apparatus for providing real-time remote translation services system 100 (e.g., reports, transcripts, bills, invoices, etc.) Finally, it should be noted that the optional printer and the optional fax machine are merely representative of the many types of peripherals that may be utilized in conjunction with computer-based apparatus for providing real-time remote translation services system 100. It is anticipated that other similar peripheral devices will be deployed in the various preferred embodiment of the present invention and no such device is excluded by its omission in FIG. 1.

Phone 190 is representative of any type of analog or digital telephone that may be communicatively coupled to real-time remote translation services system 100, including standard telephones as well as more sophisticated devices. This includes, for example, personal digital assistants ("PDAs"), Windows® mobile OS devices, Palm® OS devices, Pocket PC devices, the Apple® iPhone® and other various types of "smart phones" for example. Those skilled in the art will recognize these various devices and others that are suitable for deployment as phone 190. While somewhat less powerful than computers 170 and 180, phone 190 is also configured to communicate with data server 130 via network 120 to send and retrieve remote translation services related information to and from data server 130.

Given the standard functionality for devices that may be deployed as phone 190, this communication may be provided by a wireless Internet connection (e.g. "wi-fi" or "wi-max") or a Bluetooth connection. One example of the use for smart phone or PDA 190 in the context of computer-based apparatus for providing real-time remote translation services system 100 would be a scheduling activity conducted during off-site visits to prospective litigants or clients that may need translation services at a specific time with the resulting information being collected and stored in a database on data server 130 for later access.

It should also be understood that although courtroom 195 has been depicted and described as a courtroom where legal proceedings take place, the apparatus and methods of the present invention are not limited to any specific type of facility or location. It is contemplated that the apparatus and methods of the present invention may be deployed in a number of locations including lawyer offices, police stations, immigration facilities, and the like. Accordingly, the description of courtroom 195 as a "courtroom" should not be considered a limitation on the scope of the present invention since the present invention may be readily adapted to a wide variety of locations and applications.

Those skilled in the art will recognize that FIG. 1 depicts a fairly standard "client/server" type communication arrangement where data server 130 is considered to be a server and computers 170 and 180 are considered to be clients of data server 130. Additionally, those skilled in the art will recognize that the functionality of data server 130 may be deployed on either of computers systems 170 and 180 in a more traditional "stand-alone" environment. In either case, the methods of the present invention are designed to minimize the amount of data that must be transferred from a database to the user of apparatus for providing real-time remote translation services system 100.

Figure 2:
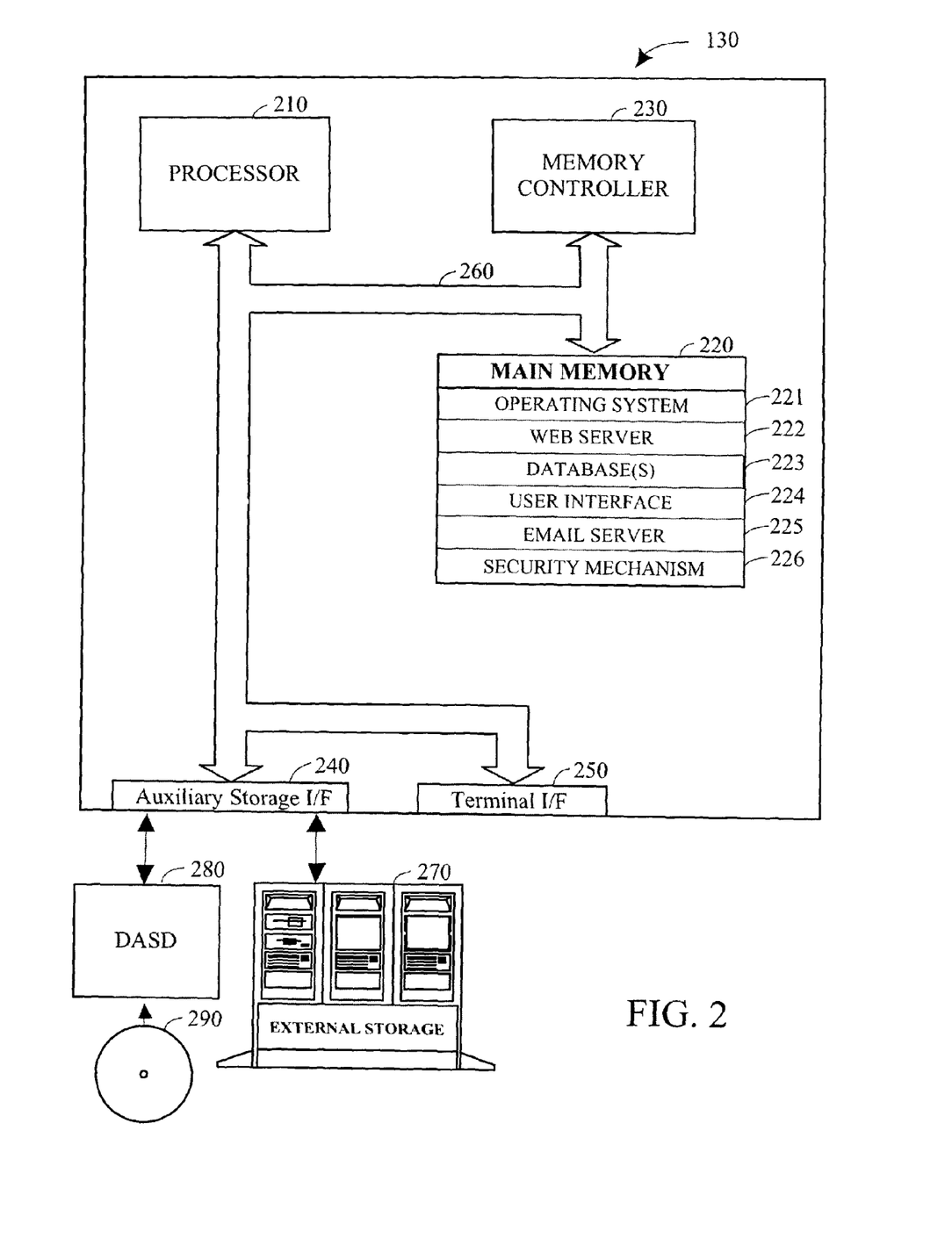
FIG. 2 is a block diagram of a server used for implementing a computer-based apparatus for providing real-time remote translation services in accordance with a preferred exemplary embodiment of the present invention.

Referring now to FIG. 2, data server 130 of FIG. 1 in accordance with a preferred embodiment of the present invention represents one of many commercially available computer systems such as a Linux-based computer system, an IBM compatible computer system, or a Macintosh computer system. However, those skilled in the art will appreciate that the methods and apparatus of the present invention apply equally to any computer system, regardless of the specific operating system and regardless of whether the computer system is a traditional "mainframe" computer, a complicated multi-user computing apparatus or a single user device such as a personal computer or workstation.

Data server 130 suitably comprises at least one Central Processing Unit (CPU) or processor 210, a main memory 220, a memory controller 230, an auxiliary storage interface 240, and a terminal interface 250, all of which are interconnected via a system bus 260. Note that various modifications, additions, or deletions may be made to data server 130 illustrated in FIG. 2 within the scope of the present invention such as the addition of cache memory or other peripheral devices. FIG. 2 is not intended to be exhaustive, but is presented to simply illustrate some of the more salient features of data server 130.

Processor 210 performs computation and control functions of data server 130, and most preferably comprises a suitable central processing unit (CPU). Processor 210 may comprise a single integrated circuit, such as a microprocessor, or may comprise any suitable number of integrated circuit devices and/or circuit boards working in cooperation to accomplish the functions of a processor or CPU. Processor 210 suitably executes one or more software programs contained within main memory 220.

Auxiliary storage interface 240 allows data server 130 to store and retrieve information from auxiliary storage devices, such as external storage mechanism 270, magnetic disk drives (e.g., hard disks or floppy diskettes) or optical storage devices (e.g., CD-ROM). One suitable storage device is a direct access storage device (DASD) 280. As shown in FIG. 2, DASD 280 may be a DVD or CD-ROM drive that may read programs and data from a DVD or CD disk 290.

It is important to note that while the present invention has been (and will continue to be) described in the context of a fully functional computer system with certain application software, those skilled in the art will appreciate that the various software mechanisms of the present invention are capable of being distributed in conjunction with tangible signal bearing media as one or more program products in a variety of forms, and that the various preferred embodiments of the present invention applies equally regardless of the particular type or location of signal bearing media used to actually carry out the distribution. Examples of signal bearing media include: recordable type media such as DVD and CD ROMS disks (e.g., disk 290), and transmission type media such as digital and analog communication links, including wireless communication links.

Various preferred embodiments of the program product may be configured to: create and modify multiple databases; track, update and store information for a plurality of clients and prospective clients, translators, and court facilities; configure and implement various search and retrieve functions for a multitude of search requests and determinations made by users of the system; track and store information about various translation services and fees; update and transmit search results to one or more users; and provide one or more user interfaces for accomplishing all of these functions. In this fashion, the appropriate entities (i.e., administrators, clients, translators, court personnel, lawyers, etc.) can utilize the program product to initiate and complete a wide variety of database-related applications for the provision of remote translation services. Similarly, a program product in accordance with one or more preferred embodiments of the present invention can also be configured to perform substantially all of the steps depicted and described in conjunction with the figures below for implementing a remote translation system as described herein.

Memory controller 230, through use of an auxiliary processor (not shown) separate from processor 210, is responsible for moving requested information from main memory 220 and/or through auxiliary storage interface 240 to processor 210. While for the purposes of explanation, memory controller 230 is shown as a separate entity; those skilled in the art understand that, in practice, portions of the function provided by memory controller 230 may actually reside in the circuitry associated with processor 210, main memory 220, and/or auxiliary storage interface 240.

Terminal interface 250 allows users, managers, system administrators, and/or computer programmers to communicate with data server 130, normally through separate workstations or through stand-alone computer systems such as computer systems 170 and computer systems 180 of FIG. 1. Although data server 130 depicted in FIG. 2 contains only a single main processor 210 and a single system bus 260, it should be understood that the present invention applies equally to computer systems having multiple processors and multiple system buses. Similarly, although the system bus 260 of the preferred embodiment is a typical hardwired, multi-drop bus, any connection means that supports bi-directional communication in a computer-related environment could be used.

Main memory 220 suitably contains an operating system 221, a web server 222, one or more databases 223, a user interface 224, an email server 225, and a security mechanism 226. The term "memory" as used herein refers to any storage location in the virtual memory space of data server 130.

It should be understood that main memory 220 might not necessarily contain all parts of all components shown. For example, portions of operating system 221 may be loaded into an instruction cache (not shown) for processor 210 to execute, while other files may well be stored on magnetic or optical disk storage devices (not shown). In addition, although database 223 is shown to reside in the same memory location as operating system 221, it is to be understood that main memory 220 may consist of multiple disparate memory locations. It should also be noted that any and all of the individual components shown in main memory 220 might be combined in various forms and distributed as a stand-alone program product. Finally, it should be noted that additional software components, not shown in this figure, might also be included.

Operating system 221 includes the software that is used to operate and control data server 130. In general, processor 210 typically executes operating system 221. Operating system 221 may be a single program or, alternatively, a collection of multiple programs that act in concert to perform the functions of an operating system. Any operating system now known to those skilled in the art or later developed may be considered for inclusion with the various preferred embodiments of the present invention.

Web server 222 may be any web server application currently known or later developed for communicating with web clients over a network such as the Internet. Examples of suitable web servers 222 include Apache web servers, Linux web servers, and the like. Additionally, other vendors have developed or will develop web servers that will be suitable for use with the various preferred embodiments of the present invention. Finally, while depicted as a single device, in certain preferred embodiments of the present invention web server 222 may be implemented as a cluster of multiple web servers, with separate and possibly redundant hardware and software systems. This configuration provides additional robustness for system uptime and reliability purposes. Regardless of the specific form of implementation, Web server 222 provides access, including a user interface, to allow individuals and entities to interact with user interface 224, including via network 120 of FIG. 1.

Database 223 is representative of any suitable database known to those skilled in the art. In the most preferred embodiments of the present invention, database 223 is a Structured Query Language (SQL) compatible database file capable of storing information relative to various items that may be of interest to the users of computer-based apparatus for providing real-time remote translation services system 100 of FIG. 1. In the most preferred embodiments of the present invention, database 223 will comprise a plurality of information that may be useful to an individual, government agency, or company that wants to schedule real-time remote translation services for activities such as trials, depositions, etc.

Database 223 will typically include a plurality of database records containing information about multiple courtrooms 195 (e.g., location, jurisdiction, types of proceedings, hours of operation, available audio/video capabilities and interface connections, etc.) as well as information about potential translators and their language capabilities (e.g., ratings, level of proficiency, availability, past performance, etc.), the type of audio and video equipment needed at each courtroom 195, the type of audio and video equipment available for deployment to a courtroom 195 at any particular time, and the type of and specific situation/circumstances for various translation applications as well as providing for scheduling, tracking and, management of multiple translators, translation sessions, equipment, translation procedures and protocols that may be used to provide various services to the prospective users of computer-based apparatus for providing real-time remote translation services system 100 of FIG. 1.

Those skilled in the art will recognize that other types of information for other types of data that may be used in other applications (e.g., historical, informational, technical, etc.) may be stored and retrieved as well. While database 223 is shown to be residing in main memory 220, it should be noted that database 223 may also be physically stored in a location other than main memory 220. For example, database 223 may be stored on external storage device 270 or DASD 280 and coupled to data server 130 via auxiliary storage I/F 240. Additionally, while shown as a single database 223, those skilled in the art will recognize the database 223 may actually comprise a series of related databases, logically linked together. Depending on the specific application and design parameters, database 223 may take many different forms when implemented.

While not required, the most preferred embodiments of computer-based apparatus for providing real-time remote translation services system 100 of FIG. 1 will typically include an email server 225. E-mail server 225 is any email server application capable of being configured and used to send and receive various status messages and updates to data server 130 and between computers 170, 180, and/or 190 of FIG. 1 via email, as may be necessary to enhance the overall process of completing activities related to the provision of remote translation services described herein. This includes the generation of automated email messages relating to the tracking and management of remote translation sessions as well as informational messages related to prospective clients, etc. Automated e-mail messages are also generated to provide notifications regarding the status of user accounts as well as other information for related to the programs and translators and other prospective participants in accordance with the preferred embodiments of the present invention.

In addition, most preferred embodiments of the present invention will include a security and/or encryption mechanism 226 for verifying access to the data and information contained in and transmitted to and from data server 130. Security mechanism 226 may be incorporated into operating system 221 and/or web server 222. Additionally, security mechanism 226 may also provide encryption capabilities for other components of computer-based apparatus for providing real-time remote translation services system 100 of FIG. 1, thereby enhancing the robustness of computer-based apparatus for providing real-time remote translation services system 100 of FIG. 1. Security mechanism 226 is most preferably configured to protect the integrity and security of the information transmitted via network 120 of FIG. 1.

Finally, depending on the type and quantity of information stored in database 223 and accessed by user interface 224, security mechanism 226 may provide different levels of security and/or encryption for different computer systems 170 and 180 of FIG. 1. Additionally, the level and type of security measures applied by security mechanism 226 may be determined by the identity of the end-user and/or the nature of a given request and/or response. In some preferred embodiments of the present invention, security mechanism 226 may be contained in or implemented in conjunction with certain hardware components (not shown this FIG.) such as hardware-based firewalls, switches, dongles, and the like.

In the most preferred embodiments of the present invention, the various components of computer-based apparatus for providing real-time remote translation services system 100 of FIG. 1 are able to communicate using multiple communications protocols and systems (e.g., Voice over IP or "VoIP", Plain Old Telephone Service or "POTS", etc.). Those skilled in the art will recognize that the communication protocols used herein may be readily adapted and configured to allow for the rapid and efficient transmission and receipt of data by and between the various components of computer-based apparatus for providing real-time remote translation services system 100 of FIG. 1. This would also include the ability to control and customize the input and output of computer-based apparatus for providing real-time remote translation services system 100 of FIG. 1 for integration with other systems. While a specific exemplary embodiment of a suitable server 130 has been provided above, those skilled in the art will recognize that many other suitable computers (with more or fewer features) may be substituted for the specific example provided herein within departing from the spirit and scope of the present invention.

Figure 3:
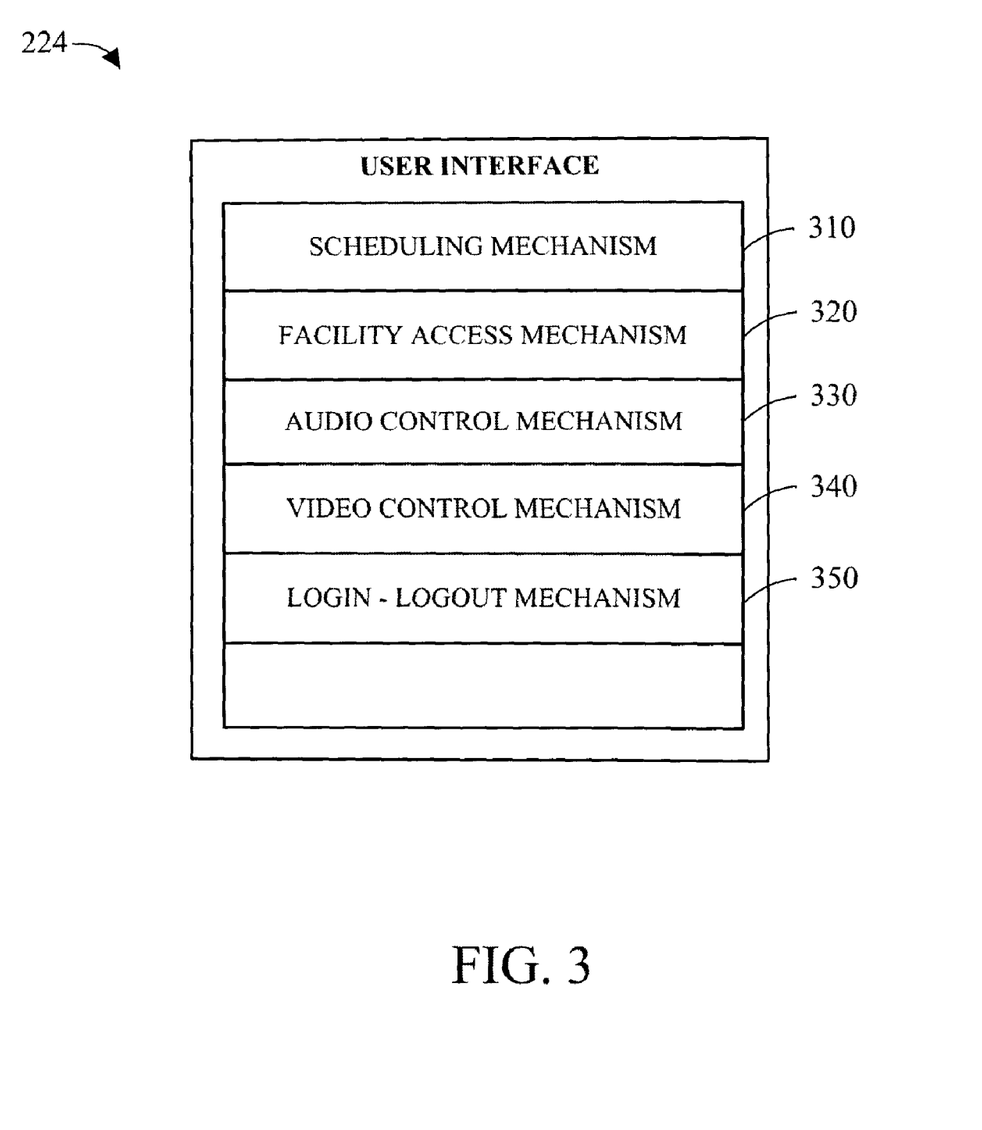
FIG. 3 is a block diagram illustrating the components of a user interface for interacting with a computer-based apparatus for providing real-time remote translation services in accordance with a preferred exemplary embodiment of the present invention.

Referring now to FIG. 3, a block diagram of the various components of user interface 224 is presented. As shown in FIG. 3, user interface 224 most preferably comprises: a scheduling mechanism 310; a facility access mechanism 320; an audio control mechanism 330; a video control mechanism 340; and a login-logout mechanism 350.

Scheduling mechanism 310 is a software mechanism that most preferably comprises a graphical user interface for identifying, scheduling and selecting the appropriate resources for a given courtroom 195 for the provision of remote translation services by a remote translator. For example, if a person needs to schedule remote translations services, they may access scheduling mechanism 310 via user interface 224 from desktop computer 170 or laptop 180 or phone 190. Scheduling mechanism 310 will allow the requester to identify the desired location for the translation services (e.g., a specific courtroom 195), the desired language for the remote translation, the time of the scheduled activity requiring the remote translation, etc.

Then, in conjunction with the records contained in database 223 of FIG. 2, the facility profile for the selected courtroom 195 can be accessed. The facility profile will provide a comprehensive overview of the types of connections and equipment that is available at courtroom 195 as well as the type of additional equipment that must be transported and installed in courtroom 195 in order to provide remote translation services at courtroom 195. It is also possible to use the facility profile to create a list of equipment to be permanently installed in courtroom 195, thereby providing the infrastructure necessary for on demand remote translation services.

By accessing database 223 of FIG. 2, the various locations, languages, times, etc. can be identified and a new translation request can be generated. Scheduling mechanism 310 may also be configured to send the translation request to one or more individuals for review and approval, thereby confirming the details of the translation request. The confirmation notice can be generated and transmitted to the requester via email, regular mail, phone call, etc. In this way, scheduling mechanism 310 provides an easy and convenient method for arranging remote translation services via the Internet or other network.

Facility access mechanism 320 is a software mechanism that most preferably provides a graphical user interface that is accessed via for selecting an available courtroom 195 to conduct remote translation services via user interface 224 from desktop computer 170 or laptop 180 or smart phone 190. At the appropriate time, the remote translator can utilize facility access mechanism to select the scheduled facility (e.g., courtroom 195) by selecting from all potential facilities as presented in a pop-up window, drop-down menu, or the like. The available facilities list is provided by accessing database 223 of FIG. 2. Once the appropriate facility has been selected, the remote translator will have the ability to control the audio and video signals and data associated with the selected courtroom 195.

Audio control mechanism 330 is a software mechanism that most preferably provides a graphical user interface for controlling the signal strength, source and destination of the audio signals that are used in conjunction with the provision of remote translation services via network 120. For example, after connecting with the appropriate courtroom 195, the remote translator can determine which source to feed to which destination, allowing for a very flexible approach to audio signal processing. For example, it may be desirable to have the audio input from a single audio input mechanism (e.g., microphone) routed to a single headset or multiple headsets, depending on the application.

By customizing the routing of the audio signal, several different operational modes may be deployed. In a first operational mode, the audio input from all of the microphones in courtroom 195 are channeled to the remote translator and the audio signal from the remote translator is channeled back to one or more reinforcement speakers in courtroom 195. This mode allows the remote interpreter to hear everything that transpires in courtroom 195 and allows everyone in courtroom 195 to hear the audio output received from the remote translator.

Figure 4:
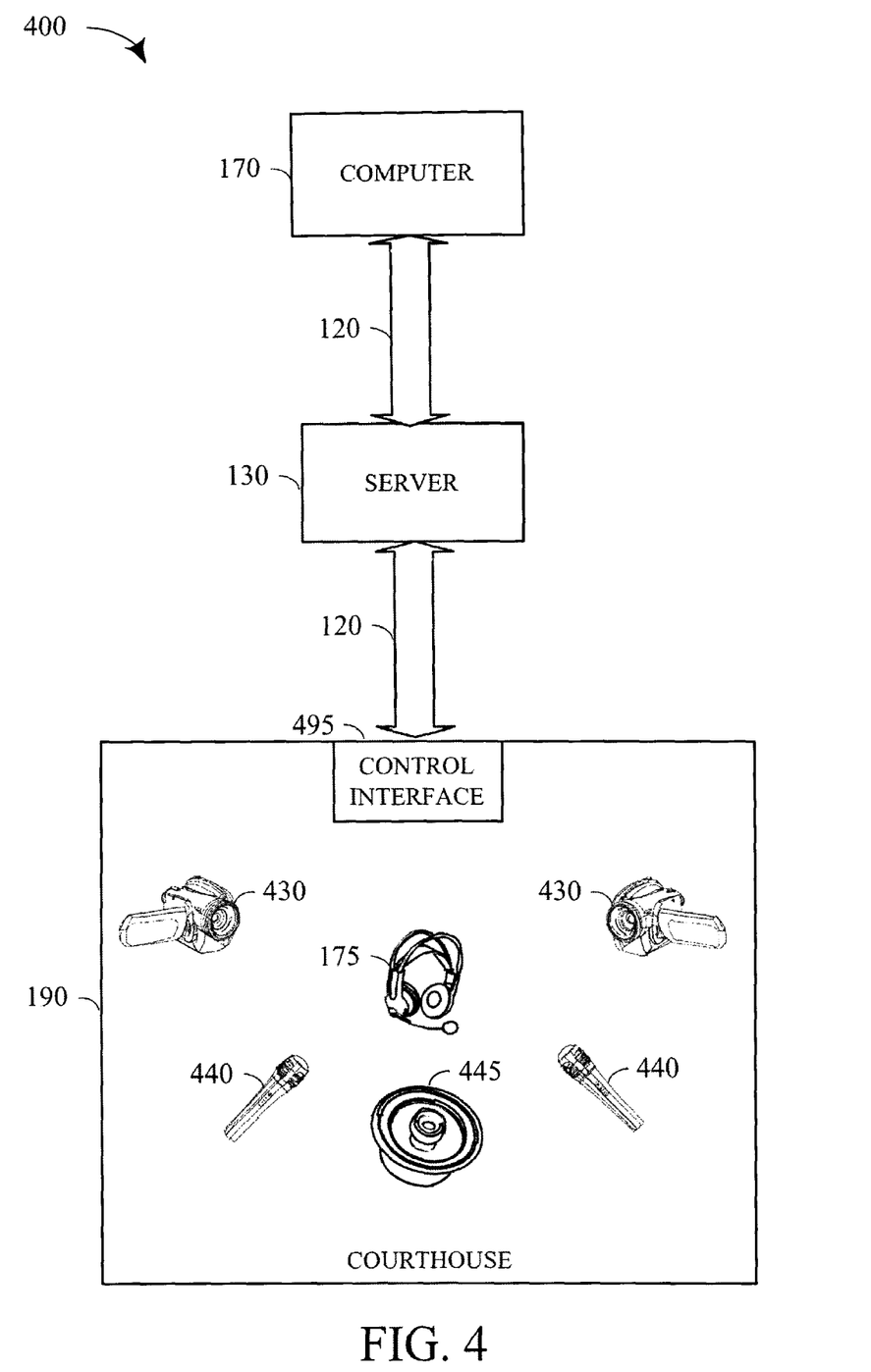
FIG. 4 is a schematic diagram of the various components of a computer-based apparatus for providing real-time remote translation services in accordance with a preferred exemplary embodiment of the present invention.

Video control mechanism 340 is a software mechanism that most preferably comprises a graphical user interface that allows the remote translator to control the operation of cameras 430 positioned within courtroom 195 from a remote location via a control interface 495 of FIG. 4 and user interface 224 of FIG. 2. This includes providing the ability to perform functions such as pan, zoom, etc. In addition, video control mechanism 340 allows the remote translator to determine which specific camera 430 to use for providing one or more video feeds to one or more locations.

Login-logout mechanism 350 is a software mechanism that most preferably comprises a graphical user interface to control access to computer-based apparatus for providing real-time remote translation services system 100 of FIG. 1. By employing a series of user names, identification protocols (e.g., passwords, bio-metric identification, etc.) and by operating in conjunction with security mechanism 226 of FIG. 2, it is possible to configure computer-based apparatus for providing real-time remote translation services system 100 of FIG. 1 so as to allow only authorized personnel to have access to the system. Additionally, by configuring the access parameters, various levels of access can be provided to personnel with different levels of responsibility and authority.

Referring now to FIG. 1 and FIG. 4, a more detailed block diagram of additional components that may be used in conjunction with computer-based apparatus for providing real-time remote translation services system 100 of FIG. 1 are depicted. As shown in FIG. 4, courthouse 195 may be configured with a plurality of audio-video devices including one or more cameras 430, one or more microphones 440, a control interface 495, one or more headsets 175, and one or more speakers 445. Cameras 430, microphones 440, and headset 175 are used to transmit audio and video signals to and from courthouse 195 to an interpreter who is using computer 170 to provide remote translation services.

Control interface 495 comprises a collection of components that are configured to connect the various components shown in FIG. 4 to network 120. Control interface 495 is configured to utilize the existing infrastructure at courthouse 195 as well as to add additional components that provide for expansion of the capabilities at courthouse 195 and for the transmission and reception of audio and video signals to and from the translator using computer 170. In at least one preferred embodiment of the present invention, control interface 495 is configured to provide the remote translator with the ability to connect and disconnect one or more phone lines, dial numbers, adjust the incoming/outgoing phone volume, and the ability to route near/far end audio signals as necessary or desired.

For example, control interface 495 is most preferably configured with at least one integrated dual-tone multi-frequency (DTMF) decoder and controller that provides for telecommunication signaling over standard analog telephone lines in the voice-frequency band between telephone handsets and other communications devices and computer 170. This allows the interpreter to send control signals to control interface 495 for purposes of switching the audio signal to different destinations, depending on the specific application.

In this embodiment, the audio signals generated by microphones 440 and headset 175 can be connected to and transmitted via the telephone system in courthouse 195 via connection to a standard telephone jack or similar interface (e.g., RJ-11 or the like). The audio signals can also be routed from the telephone system in courthouse 195 to the translator, thereby allowing the translator to hear the proceedings in courthouse 195. Similarly, the audio signal generated by the interpreter can be routed to headset 175 or some other destination via audio control signals sent via the DTMF controller.

In addition, control interface 495 is configured with one or more digital signal processors (DSP) that allows for flexible control of the audio signal and provides features such as mixing, attenuation, equalization, and echo cancellation processing for the audio signal. In the most preferred embodiments of the present invention, the DSP is also equipped with an Acoustic Echo Canceller (AEC) circuit. The AEC is configured to provide perceptually full duplex quality in average-sized office rooms when used in inexpensive speakerphones or microphones such as a single omni-directional microphone, typical of those found in courtroom 195.

Microphones 440 are most preferably one or more high quality microphones and may already exist within courtroom 195; or microphones 440 may comprise a combination of existing microphones and additional microphones that are used to augment the existing microphone system infrastructure within courtroom 195, including the microphone associated with headset 175. In either case, microphones 440 are used to capture audio signals from within courtroom 195 and those audio signals can be routed to the appropriate location by using signals generated by control interface 495, under the control of the remote interpreter providing the remote translation services via user interface 224 of FIG. 2. The audio signals provided by microphones 440 are most preferably routed through the DSP to enhance the quality of the audio signal. The audio signals may be communicatively coupled to network 120 of FIG. 1 using any appropriate media, including the standard telephone system within courtroom 195.

Cameras 430 most preferably comprise one or more Internet protocol (IP) based digital cameras that are installed into courtroom 195 and that are configured to provide a video signal that can be transmitted via network 120 to computer 170 or computer 180, thereby allowing the remote interpreter to observe the proceedings in courtroom 195. Additionally, control interface 495 provides a control link for the interpreter, allowing the interpreter to control the features of cameras 430 including pan, zoom, tilt, etc. This functionality allows the interpreter to focus on the person that they are interpreting for, providing enhanced interpretation facility as the interpreter can see the emotions of the person that they are interpreting for as well as any gestures, etc. This provides for a better translation of the foreign language because the interpreter is able to see the context for the conversation that needs to be translated.

Speaker 445 is representative of any speaker that may be used to broadcast an audible audio signal into courtroom 195. In the most preferred embodiments of the present invention, the output of speaker 445 may be controlled by the remote translator via control interface 495 and is typically used to selectively broadcast the translation provided by the remote translator at the desired time and to the desired speaker 445. Speaker 445 may be a speaker that is part of the existing infrastructure of courtroom 195 or it may be an additional speaker introduced into courtroom 195 specifically for use in conjunction with computer-based apparatus for providing real-time remote translation services system 100 of FIG. 1.

One or more headset 175 may be made available to one or more individuals in courtroom 195 and the audio signal transmitted to each headset 175 may be selectively activated or de-activated via control interface 495 by the remote translator. This allows for a variety of controlled environments for various applications.

Figure 5:
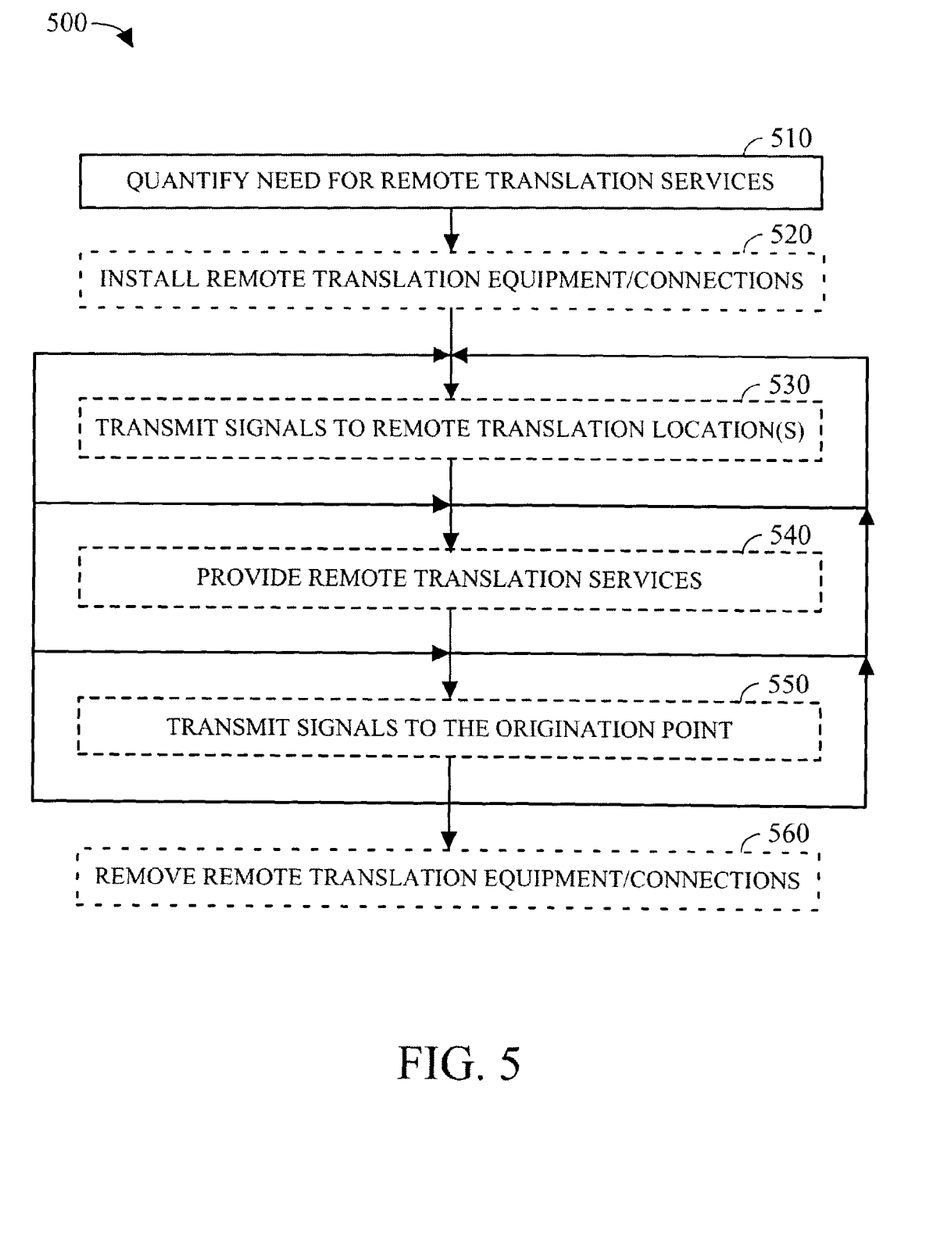
FIG. 5 is a flow chart for a methodology used in implementing a computer-based apparatus for providing real-time remote translation services in accordance with a preferred exemplary embodiment of the present invention.

Referring now to FIG. 5, a method 500 for providing real-time remote translation services is depicted (dotted lines represent optional steps). As shown in FIG. 5, the need for remote translation services will be quantified (step 510). This may be accomplished by many different means, but in the most preferred embodiments of the present invention, a user will access and input the requirements for the remote translation services via computer 170 or computer 180. This may include data gathering and storage activities that will identify the time and place for the remote translation, the language(s) to be interpreted, the desired translator, etc. Using this information, the remote translation session can be scheduled and the necessary or desired equipment and personnel can be identified by accessing database 223 of FIG. 2.

Given that database 223 will most preferably contain information regarding the type and quantity of audio and video equipment and connections available at a given courthouse 195, a standard profile for each courthouse 195 can be quickly and easily generated to ensure that the appropriate equipment is provided for the scheduled session or sessions. The standard profile can be printed using an optional printer and used as a checklist to ensure that the appropriate equipment is loaded and deployed. As previously mentioned, in certain embodiments of the present invention, the audio-video equipment will be permanently installed in a remote location where remote translation services will be provided on a regular basis (e.g., a courtroom where foreign language translation needs are high). However, in other applications (e.g., a deposition at a lawyer's office), the audio-video equipment will be installed on a temporary basis and will be removed after use.

Once the appropriate equipment has been identified and loaded, the equipment can be transported to the desired remote location(s) (e.g., courthouse or lawyer's office) and installed, if necessary (step 520). This will typically include the installation of audio and video equipment at the remote location. In the case of the video equipment, one or more cameras will be installed in the remote location to provide a video feed from the remote location to the translator(s). For the audio equipment, one or more microphones or other audio input devices will be installed so as to transmit audio signals from the remote location to the translator. Additionally, a headset or speaker will also be installed so as to transmit audio signals from the translator to the remote location. The audio signal may be routed via the existing telephone system or via the Internet via network 120 of FIG. 1. This may be a permanent or temporary installation, depending on the specific application.

Once the equipment has been installed, audio and/or video signal may be transmitted from the remote location to the translator(s) (step 530) where the remote translation services may be provided by one or more translators (step 540) and the signals from the translator(s) can then be transmitted back to the location where the audio and/or video signals originated (step 550), thereby completing the provision of one or more translations from the remote translator to the courtroom or other facility. As shown in FIG. 5, it should be noted that the process methodology described herein contemplates multiple transmissions of audio and/or video signals between one or more translators and one or more remote locations, without any prescribed order. Accordingly, signals may be transmitted to and from either location in any order or in no particular order at all. Depending on the application, the signals will be transmitted in various sequences and at various times, as needed to accomplish the translation process.

Finally, once the provision of remote translation has been completed, and if the installation was for a temporary application, the equipment may be removed from the remote location (step 560) and returned to the regular storage location or to another remote location for deployment in conjunction with another remote translation application.

From the foregoing description, it should be appreciated that apparatus and methods for providing real-time remote translation services disclosed herein presents significant benefits that would be apparent to one skilled in the art. Furthermore, while multiple embodiments have been presented in the foregoing description, it should be appreciated that a vast number of variations in the embodiments exist. Lastly, it should be appreciated that these embodiments are preferred exemplary embodiments only and are not intended to limit the scope, applicability, or configuration of the invention in any way. Rather, the foregoing detailed description provides those skilled in the art with a convenient road map for implementing a preferred exemplary embodiment of the invention, it being understood that various changes may be made in the function and arrangement of elements described in the exemplary preferred embodiment without departing from the spirit and scope of the invention as set forth in the appended claims.

The invention claimed is:

1. An apparatus comprising:
   at least one processor;
   at least one memory coupled to said at least one processor;
   a network coupled to said at least one processor;
   a control interface coupled to said at least one processor via a network;
   at least one audio input mechanism communicatively coupled to said control interface, said at least one audio input mechanism being configured to capture at least one audio signal;
   at least one user-controllable video input mechanism coupled to said network, said at least one user-controllable video input mechanism being configured to capture at least one video signal thereby allowing an interpreter to monitor at least one facial characteristic of a speaker;
   an audio output mechanism, said audio output mechanism being configured to output a translated audio signal; and
   a user interface, said user interface being configured to provide user-controllable routing of said at least one audio signal and said at least one video signal, thereby routing said at least one audio signal and said at least one video signal to a remote location for translation purposes, said translated audio signal being routed to isolated headsets by said translator when interpreting into a foreign language.

2. The apparatus of claim 1 wherein said at least one audio input mechanism comprises at least one of a microphone and a telephone.

3. The apparatus of claim 1 further comprising a control interface, said control interface comprising:
- at least one integrated dual-tone multi-frequency (DTMF) decoder and controller, said DTMF being configured to provide for telecommunication signaling over standard analog telephone lines in the voice-frequency band;
- at least one microphone coupled to said control interface, said at least one microphone being configured to capture at least one audio signal;
- at least one digital signal processor (DSP), said DSP comprising an acoustic echo canceller (AEC) circuit, said DSP being configured to control said at least one audio signal and provide features such as mixing, attenuation, equalization, and
- echo cancellation for said at least one audio signal;
- at least one audio speaker coupled to said control interface, said audio speaker being configured to broadcast a translated audio signal;
- a standard phone line coupled to said control interface;
- at least one video camera control interface couple, said at least one video camera being configured to capture at least one video signal;
- wherein control interface is configured to allow a translator to remotely control said at least one microphone and said at least one video camera and selectively route said at least one audio signal and said at least one video signal to a plurality of locations for remote translation purposes.

4. The apparatus of claim 1 at least one video input mechanism comprises a webcam.

5. The apparatus of claim 1 wherein said at least one audio signal is routed to at least one translator for translation purposes by coupling said at least one audio input device to a standard telephone connection in at least one courtroom and wherein said at least one video signal is routed to said at least one translator via the Internet for translation purposes.

6. The apparatus of claim 1 wherein said at least one audio signal comprises an audio signal transmitted in a first language, wherein said at least one audio signal is transmitted to a remote location and is translated to a second language and captured by a second audio input device, thereby creating a translated audio signal and said translated audio signal is then transmitted to a point of origination for said at least one audio signal.

7. The apparatus of claim 6 wherein said audio signal is remotely routed to a plurality of different audio output mechanisms by transmitting a plurality of signals over said standard telephone line.

8. The apparatus of claim 1, further comprising a user interface residing in said memory, said user interface comprising at least two of:
- a scheduling mechanism, said scheduling mechanism being configured to provide information regarding the scheduling of remote translation services for at least one courtroom;
- a facility access mechanism, said facility access mechanism being configured to provide at least one facility profile, said at least one facility profile containing information on the presence and availability of audio-video equipment for said at least one courtroom;
- an audio control mechanism, said audio control mechanism being configured to provide user-selectable routing of said at least one audio signal to a plurality of audio output devices; and
- a video control mechanism, said video control mechanism being configured to provide user-selectable routing of said at least one video signal to a plurality of video output devices.

9. The apparatus of claim 1 further comprising at least one database residing in said at least one memory, said at least one database being configured with at least one remote location profile, said at least one remote location profile providing an equipment listing of equipment available for use at a remote location to provide audio and video signals from said remote location to a translator for purposes of providing remote translation.

10. The apparatus of claim 9 wherein said at least one database further comprises:
- a plurality of records containing information regarding a plurality of translators;
- a plurality of records containing information about a plurality of languages;
- a plurality of records containing information regarding a plurality of courthouses;
- a plurality of records containing information regarding a plurality of audio equipment installed at said plurality of courthouses; and
- a plurality of records containing information regarding a plurality of video equipment installed at said plurality of courthouses.

11. The apparatus of claim 1 further comprising an audio control mechanism, said audio control mechanism providing a graphical user interface for controlling a signal strength, an audio signal source, and an audio signal destination.

12. The apparatus of claim 1 further comprising a video control mechanism, said video control mechanism providing a graphical user interface that allows a remote translator to control the operation of at least one from a remote location.

13. The apparatus of claim 1 further comprising:
- an audio control mechanism, said audio control mechanism providing a graphical user interface for controlling at least one of a signal strength, an audio signal source, and an audio signal destination; and
- a video control mechanism, said video control mechanism providing a graphical user interface that allows a remote translator to control the operation of at least one from a remote location.

14. A computer-implemented method for providing remote translation services comprising the steps of:
- providing a control interface at a first location;
- connecting said control interface to a standard telephone line;
- connecting at least one audio input mechanism to said control interface;
- connecting a video input control mechanism to said control interface;
- connecting said video input control mechanism to at least one video input device;
- controlling said at least one audio input mechanism via a plurality of signals transmitted over said standard telephone line;
- capturing an audio signal with said first audio input device;
- controlling said at least one video input mechanism via a plurality of signals transmitted over said standard telephone line;
- capturing a video signal with said at least one video input mechanism thereby allowing an interpreter to monitor at least one facial characteristic of a speaker;
- applying at least one level and type of security measure determined by the identity of an end-user;

applying at least one level and type of security measure determined by based on the nature of a given request or response;
transmitting said audio signal to a second location;
transmitting said video signal to a second location;
displaying said video signal on a computer monitor;
translating at least a portion of said audio signal from a first language to a second language while said video signal is being displayed on said computer monitor, thereby creating a translated audio signal; and
transmitting said translated audio signal back to said first location, said translated audio signal being routed to isolated headsets by said translator when interpreting into a foreign language.

15. The method of claim 14 wherein said control interface comprises:
    at least one integrated dual-tone multi-frequency (DTMF) decoder and controller, said DTMF being configured to provide for telecommunication signaling over standard analog telephone lines in the voice-frequency band;
    at least one digital signal processor (DSP), said DSP comprising an acoustic echo canceller (AEC) circuit, said DSP being configured to control said at least one audio signal and provide features such as mixing, attenuation, equalization, and
    echo cancellation for said at least one audio signal;
    at least one audio speaker coupled to said control interface, said audio speaker being configured to broadcast said translated audio signal;
    wherein control interface is configured to allow a translator to remotely control said at least one microphone and said at least one video camera and selectively route said at least one audio signal and said at least one video signal to a plurality of locations for remote translation purposes.

16. The method of claim 14 further comprising the step of accessing at least one database to access at least one remote location profile, said at least one remote location profile providing an equipment listing of equipment available for use at a remote location to provide audio and video signals from said remote location to a translator for purposes of providing remote translation.

17. The method of claim 14 further comprising the steps of:
    translating at least a portion of said audio signal from a first language to a second language, thereby creating a translated audio signal;
    transmitting said translated audio signal to said control interface via said standard phone line; and
    outputting said translated audio signal using at least one audio output mechanism.

18. The method of claim 14 further comprising the step of accessing at least one database to schedule a remote translation session, said at least one database comprising:
    a plurality of records containing information regarding a plurality of translators;
    a plurality of records containing information about a plurality of languages;
    a plurality of records containing information regarding a plurality of courthouses;
    a plurality of records containing information regarding a plurality of audio equipment installed at said plurality of courthouses; and
    a plurality of records containing information regarding a plurality of video equipment installed at said plurality of courthouses.

19. The method of claim 14 further comprising the step of performing remote translation services by accessing a user interface, said user interface comprising:
    a scheduling mechanism, said scheduling mechanism being configured to provide information regarding the scheduling of remote translation services for at least one courtroom;
    a facility access mechanism, said facility access mechanism being configured to provide at least one facility profile, said at least one facility profile containing information on the presence and availability of audio-video equipment for said at least one courtroom;
    an audio control mechanism, said audio control mechanism being configured to provide user-selectable routing of said at least one audio signal to a plurality of user-selectable audio output devices; and
    a video control mechanism, said video control mechanism being configured to provide user-selectable routing of said at least one video signal to a plurality of user-selectable video output devices.

20. An system for providing remote translation from a first language into a second language, the system comprising:
    a network;
    at least one computer coupled to said network;
    a server coupled to said network, said server comprising at least one memory;
    a control interface coupled to said server and said at least one computer via said network, said control interface comprising:
    at least one integrated dual-tone multi-frequency (DTMF) decoder and controller, said DTMF being configured to provide for telecommunication signaling over standard analog telephone lines in the voice-frequency band; and
    at least one digital signal processor (DSP), said DSP comprising an acoustic echo canceller (AEC) circuit, said DSP being configured to control said at least one audio signal and provide features such as mixing, attenuation, equalization, and echo cancellation for said at least one audio signal a standard telephone line coupled to said control interface;
    at least one microphone coupled to said control interface, said at least one microphone being configured to capture at least one audio signal;
    at least one audio speaker coupled to said control interface, said audio speaker being configured to broadcast a translated audio signal;
    at least one video camera coupled to said video camera control interface, said at least one video camera being configured to capture at least one video signal;
    user interface, said user interface being configured to provide user-controllable routing of said at least one audio signal and said at least one video signal, thereby routing said at least one audio signal and said at least one video signal to a remote location for translation purposes;
    a user interface residing in said memory, said user interface comprising:
    a scheduling mechanism, said scheduling mechanism being configured to provide information regarding the scheduling of remote translation services for at least one courtroom;
    a facility access mechanism, said facility access mechanism being configured to provide at least one facility profile, said at least one facility profile containing information on the presence and availability of audio-video equipment for said at least one courtroom;

an audio control mechanism, said audio control mechanism being configured to provide user-selectable routing of said at least one audio signal to a plurality of audio output devices; and
a video control mechanism, said video control mechanism being configured to provide user-selectable routing of said at least one video signal to a plurality of video output devices;
at least one database residing in said at least one memory, said database comprising:
a plurality of records containing information regarding a plurality of translators;
a plurality of records containing information about a plurality of languages;
a plurality of records containing information regarding a plurality of courthouses;
a plurality of records containing information regarding a plurality of audio equipment installed at said plurality of courthouses; and
a plurality of records containing information regarding a plurality of video equipment installed at said plurality of courthouses; and
wherein control interface is configured to allow a translator to remotely control said at least one microphone and said at least one video camera and selectively route said at least one audio signal and said at least one video signal to a plurality of locations for remote translation purposes by transmitting a plurality of control signals over said standard telephone line.

* * * * *